US009135180B2

(12) United States Patent
Busaba et al.

(10) Patent No.: US 9,135,180 B2
(45) Date of Patent: Sep. 15, 2015

(54) PREFETCHING FOR MULTIPLE PARENT CORES IN A MULTI-CORE CHIP

(71) Applicant: International Business Machines Corporation, Armonk, NY (US)

(72) Inventors: Fadi Y. Busaba, Poughkeepsie, NY (US); Steven R. Carlough, Wappingers Falls, NY (US); Christopher A. Krygowski, Lagrangeville, NY (US); Brian R. Prasky, Campbell Hall, NY (US); Chung-lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 13/785,389

(22) Filed: Mar. 5, 2013

(65) Prior Publication Data

US 2014/0258630 A1 Sep. 11, 2014

(51) Int. Cl.
*G06F 12/08* (2006.01)

(52) U.S. Cl.
CPC .......... *G06F 12/0862* (2013.01); *G06F 12/084* (2013.01); *G06F 12/0811* (2013.01); *G06F 2212/6026* (2013.01); *G06F 2212/6028* (2013.01); *G06F 2212/622* (2013.01)

(58) Field of Classification Search
CPC .................... G06F 12/0862; G06F 2212/6028; G06F 2212/6026; G06F 9/30047; G06F 12/084; G06F 2212/602
USPC .................................................. 711/130, 137
See application file for complete search history.

(56) References Cited

U.S. PATENT DOCUMENTS

| 6,470,427 | B1 | 10/2002 | Arimilli et al. |
|---|---|---|---|
| 7,509,481 | B2 | 3/2009 | Chaudhry et al. |
| 7,730,263 | B2 | 6/2010 | Burtscher et al. |
| 7,950,012 | B2 | 5/2011 | Tirumalai et al. |
| 7,962,314 | B2 | 6/2011 | Chernoff |
| 7,975,107 | B2 | 7/2011 | Beckmann et al. |
| 2004/0148491 | A1* | 7/2004 | Damron .......................... 712/34 |

(Continued)

FOREIGN PATENT DOCUMENTS

JP 2010217992 A 9/2010

OTHER PUBLICATIONS

UK Internation Search Report and Written Opinion for International Application No. PCT/IB2014/058939; International Filing Date: Feb. 2, 2014; Date of Mailing: May 13, 2014; 6 pages.

(Continued)

*Primary Examiner* — Jasmine Song
(74) *Attorney, Agent, or Firm* — Cantor Colburn LLP; Margaret McNamara (57) ABSTRACT

Embodiments relate to a method, system, and computer program product for prefetching data on a chip. The chip has at least one scout core, multiple parent cores that cooperate together to execute various tasks, and a shared cache that is common between the scout core and the multiple parent cores. An aspect of the embodiments includes monitoring the multiple parent cores by the at least one scout core through the shared cache for a shared cache access occurring in a base parent core. The method includes saving a fetch address by the at least one scout core based on the shared cache access occurring. The fetch address indicates a location of a specific line of cache requested by the base parent core.

5 Claims, 5 Drawing Sheets (56) References Cited

U.S. PATENT DOCUMENTS

| | | |
|---|---|---|
| 2006/0155963 A1 | 7/2006 | Bohrer et al. |
| 2007/0156971 A1 | 7/2007 | Sistla et al. |
| 2008/0059715 A1 | 3/2008 | Tomita et al. |
| 2008/0141268 A1 | 6/2008 | Tirumalai et al. |
| 2009/0199181 A1 | 8/2009 | Arimilli et al. |
| 2010/0241811 A1 | 9/2010 | Solihin |
| 2010/0281282 A1 | 11/2010 | Sawyers |
| 2010/0293312 A1 | 11/2010 | Sonnier et al. |
| 2010/0299496 A1 | 11/2010 | Arimilli et al. |
| 2011/0055805 A1 | 3/2011 | Herdeg et al. |
| 2011/0113199 A1 | 5/2011 | Tang et al. |
| 2011/0125971 A1 | 5/2011 | Kruglick |
| 2011/0167416 A1 | 7/2011 | Sager et al. |
| 2011/0231612 A1 | 9/2011 | Karlsson et al. |
| 2011/0296431 A1 | 12/2011 | Gschwind et al. |

OTHER PUBLICATIONS

UK International Serach Report and Written Opinion for International Application No. PCT/IB2014/058955; International Filing Date: Feb. 13, 2014; Date of mailing: Jun. 16, 2014; 10 pages.

J. Lee, et al., "Prefetching with Helper Threads for Loosely Coupled Multiprocessor Systems." IEEE Transactions on Parallel and Distributed Systems: 2009, pp. 1-16; vol. 20.

Darouich et al., "Service de Configuration Predictif pour Plateforme Multicoeur Reconfigurable Heterogene," RenPar'18/SympA'2008/CFSE'6, version 1-4, Jan. 2008.

Chaudhry et al., "High-Performance Throughput Computing," IEEE Computer Society, May-Jun. 2005, pp. 32-45.

Ganusov et al. "Efficient Emulation of Hardware Prefetchers vis Event-Driven Helper Threading," Sep. 2006, pp. 144-153.

U.S. Appl. No. 13/785,369; Non-Final Office Action, Date Filed: Mar. 5, 2013, Date Mailed: Nov. 6, 2014; 22 pages.

U.S. Appl. No. 13/785,377; Non-Final Office Action; Date Filed: Mar. 5, 2013; Date Mailed: Oct. 23, 2014; 19 pages.

U.S. Appl. No. 13/785,394; Non-Final Office Action; Date Filed: Mar. 5, 2013; Date Mailed: Jan. 14, 2015; 32 pages.

U.S. Appl. No. 14/501,661; Non-Final Office Action, Date Filed: Sep. 30, 2014; Date Mailed: Nov. 6, 2014; 19 pages.

U.S. Appl. No. 14/501,697, Non-Final Office Action; Date Filed: Sep. 30, 2014; Date Mailed: Oct. 24, 2014; 13 pages.

U.S. Appl. No. 14/501,757; Non-Final Office Action; Date Filed: Sep. 30, 2014; Date Mailed: Nov. 6, 2014; 18 pages.

\* cited by examiner

PREFETCHING FOR MULTIPLE PARENT CORES IN A MULTI-CORE CHIP

BACKGROUND

The present invention relates generally to multi-core chips having multiple parent cores and a scout core, and more specifically, to prefetching for multiple parent cores in a multi-core chip.

Single thread processor performance growth has been limited due to power requirements needed for single thread performance. Doubling the power requirements of a processor through increased frequency and/or functional features does not necessarily yield a performance gain greater than or equal to the increased power requirement. This is because the performance gain to power gain ratio is significantly skewed. To provide chip performance growth, significant portions of the power budget may be devoted to placing additional cores on a chip. While cache and memory sharing prevents the performance increase from being equal to the ratio increase in the number of cores, the performance gain for increasing a core count on the chip may yield a greater performance/watt gain than solely improving the performance of a single core processor.

In one approach to enhance single thread performance, a secondary core on the same chip as a primary or parent core may be leveraged as a scout core. Specifically, the scout core may be used to prefetch data from a shared cache into the parent core's private cache. This approach may be especially useful in the event the parent core encounters a cache miss. A cache miss occurs when a particular line of data causes a search of a directory of the parent core, and the requested line of cache is not present. One typical approach to obtain the missing cache line is to initiate a fetch operation to a higher level of cache. The scout core provides a mechanism that is used to prefetch data needed by the parent core.

Sometimes the chip may include multiple parent cores that cooperate together to execute various tasks. Specifically, for example, in a multi-threaded environment the parent cores may be working together on a similar task. Alternatively, in another approach one of the parent cores may be working on a task, and then handing off the task to another parent core. In both cases, the cache miss behavior on one of the parent cores may be correlated to the content worked on by another parent core.

SUMMARY

Embodiments relate to a system for prefetching data on a chip. The chip has at least one scout core, multiple parent cores that cooperate together to execute various tasks, and a shared cache that is common between the scout core and the multiple parent cores. One of the multiple parent cores is a base parent core and at least one other of the multiple parent cores is a mirroring parent core. An aspect of the embodiments include monitoring the multiple parent cores by the at least one scout core through the shared cache for a shared cache access occurring in the base parent core. The method includes saving a fetch address by the at least one scout core based on the shared cache access occurring. The fetch address indicates a location of a specific line of cache requested by the base parent core. The method includes determining an existence of a specific pattern by the at least one scout core. The specific pattern is based on the fetch address. The specific pattern indicates that the mirroring parent core has a cache miss pattern correlating to a shared cache access pattern of the base parent core. The method includes sending a prefetch request by the at least one scout core on the behalf of the mirroring parent core based on determining the existence of the specific pattern. The prefetch request is for fetching at least one projected future missing line of cache.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

An embodiment for prefetching data for a multi-core chip is disclosed. In one exemplary embodiment, the multi-core chip includes at least one scout core and multiple parent cores. The parent cores cooperate together to execute various tasks. The scout core monitors the parent cores to determine if a shared cache access has occurred, and saves a fetch address in a stack if the shared cache access has occurred. The fetch address indicates a specific line of cache requested by the parent core experiencing the shared cache access. Each parent core is associated with a corresponding stack. The scout core determines the existence of a specific pattern between the stacks. The specific pattern indicates at least one of the parent cores (referred to as a mirroring parent core) has a shared cache access pattern that correlates to the content worked on by another parent core. The scout core may then send at least one prefetch request to the shared cache for a projected future missing line of cache. The projected future missing line of cache is intended for the mirroring parent core. Thus, the scout core may be able to predict or anticipate future data that may be needed by one or more parent cores based on the cache access behavior of another parent core.

Figure 1:
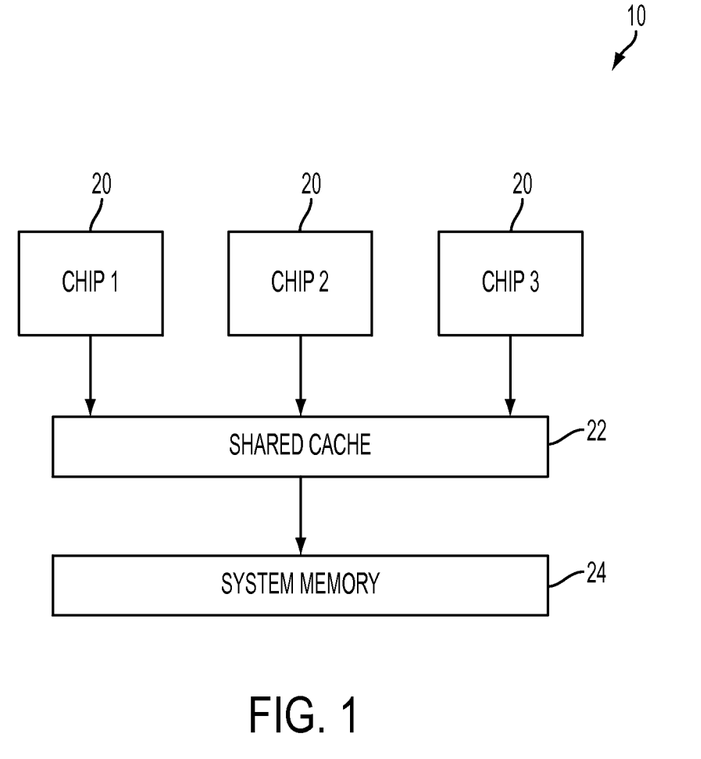
FIG. 1 depicts multi-core chips in accordance with an embodiment.

FIG. 1 illustrates an example of a computing system 10 in accordance with one embodiment. The computing system 10 includes at least one central processing (CP) chip 20. In the exemplary embodiment as shown in FIG. 1, three CP chips 20 are shown, however it is to be understood that any number of CP chips 20 may be used as well. For example, in one approach, the computing system 10 may include eight CP chips 20. In another approach, the computing system 10 may include up to twelve or sixteen CP chips 20. Each CP chip 20 is in communication with a shared cache 22 and a system memory 24.

Figure 2:
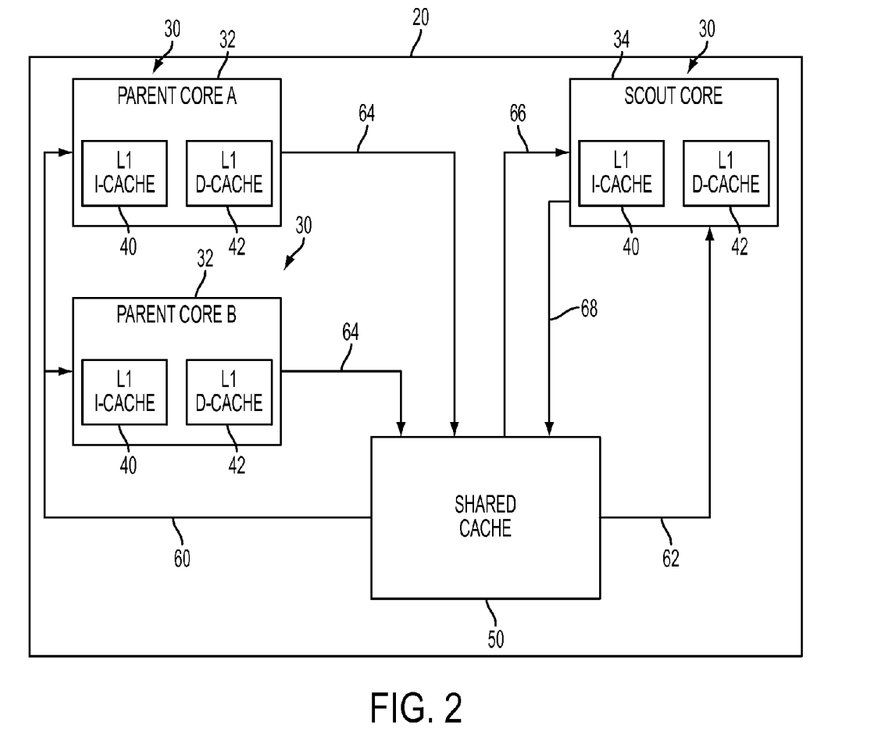
FIG. 2 depicts a central processing (CP) chip in accordance with an embodiment.

Referring now to FIGS. 1-2, each CP chip 20 includes multiple cores 30 for the reading and executing of instructions. For example, in the exemplary embodiment as shown in FIG. 2, each CP chip 20 includes multiple parent cores 32 (labeled as 'Parent Core A' and 'Parent Core B') and a single scout core 34, however it is understood that multiple scout cores 34 may be used as well. Moreover, although two parent cores 32 are illustrated in communication with the scout core 34, it is to be understood more than two parent cores 32 may be used as well. Each core 30 also includes a respective instruction I-cache 40 and a data D-cache 42. In the exemplary embodiment as shown in FIG. 2, the cores 30 each include only a level one (L1) cache, however it is to be understood that in various embodiments the cores 30 may also include a level two (L2) cache as well. Each core 30 is operatively coupled to a shared cache 50. In the embodiment as shown in FIG. 2, the shared cache 50 is an L2 cache, however it is to be understood that the shared cache 50 may also be a level three (L3) cache as well.

A data return bus 60 is provided to connect each of the parent cores 32 to the shared cache 50, and a data return bus 62 is provided between the scout core 34 and the shared cache 50. A fetch request bus 64 is provided for each of the parent cores 32 to connect one of the parent cores 32 with the shared cache 50. Data is sent from the parent core 32 to the shared cache 50 through the fetch request bus 64. A fetch monitoring bus 66 connects the scout core 34 with the shared cache 50, where the scout core 34 monitors the shared cache 50 through the fetch monitoring bus 66. A fetch request bus 68 is located between the scout core 34 and the shared cache 50 to send various prefetch requests from the scout core 34 to the shared cache 50. The fetch request bus 68 may also be used for typical fetching as that which is done by fetch request bus 64. Such fetching is needed for loading prefetch code into the scout core 34 along with potentially needing to load in further data for analysis should the data that is being analyzed not fit entirely into the local D-cache 42 and/or the prefetch code not fit entirely into the local I-cache 40.

In the embodiment as shown in FIG. 2, the shared cache 50 acts as a hub or a connection such that the scout core 34 may monitor the parent cores 32. The parent cores 32 are also in communication with one another through the shared cache 50 as well, where the parent cores 32 cooperate together to execute various tasks. Specifically, for example, in a multi-threaded environment the parent cores 32 may be working together on a similar task. Alternatively, in another approach one of the parent cores 32 (e.g., Parent Core A) may be working on a task, and then hands off the task to another parent core 32 (e.g., Parent Core B). In both cases, shared cache access behavior on one of the parent cores 32 may be correlated to the content worked on by another parent core 32. In the embodiments as discussed, the shared cache 50 supports a L1 write-through D-cache 42. A write-through cache allows for values that are written in the L1 D-cache 42 to be stored to the next level of memory (e.g., the chip shared cache 50).

A shared cache access of a specific parent core 32 (e.g., Parent Core A) may occur in the event the specific parent core 32 requests a memory address from either the I-cache 40 or the D-cache 42 of the specific parent core 32. If the I-cache 40 or the D-cache 42 does not contain a specific line of cache requested from the parent core 32, a cache miss occurs and the specific parent core 32 that experienced the cache miss (e.g., Parent Core A) may send a fetch request for the specific line of cache to the shared cache 50 through the fetch request bus 64. The scout core 34 monitors the shared cache 50 through the fetch monitoring bus 66 to determine if a fetch request for a specific line of cache by one of the parent cores 32 has occurred. It should be noted that because the L1 D-cache cache 42 is a write-though cache, even if a specific line or lines of cache exist in the D-cache 42 and a cache miss has not occurred, the L1 D-cache 42 allows the line or lines of cache to be stored to the shared cache 50.

Figure 3:
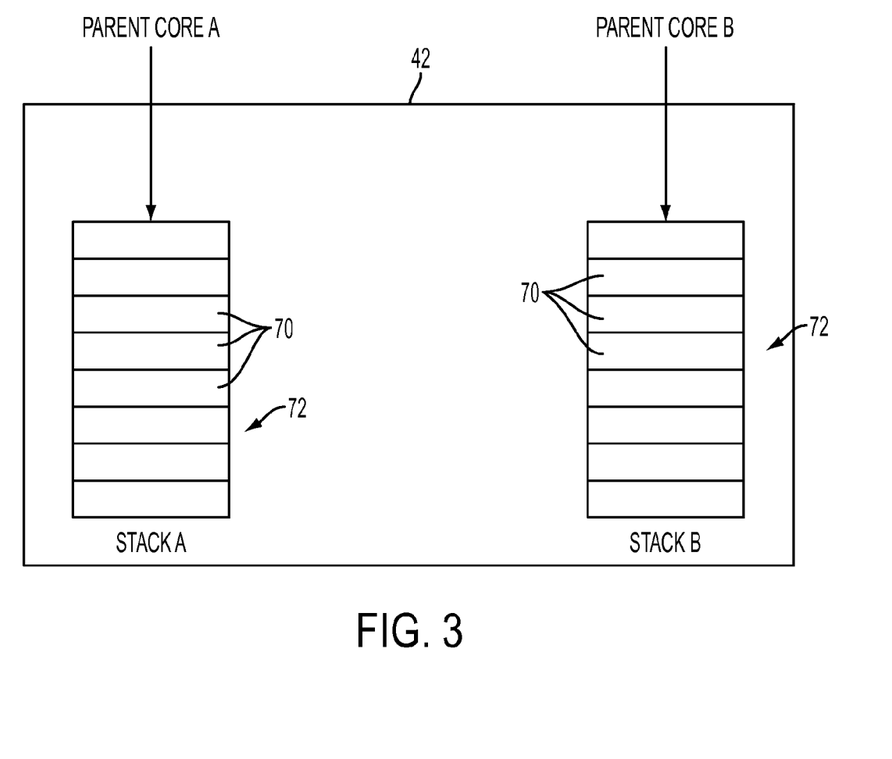
FIG. 3 depicts an illustration of a stack saved in memory.

In the event the specific parent core 32 (e.g., Parent Core A) makes a fetch request to the shared cache 50, the scout core 34 may save a fetch address 70 (shown in FIG. 3). The fetch address 70 indicates the location of the specific line of cache that was requested by the parent core 32 during the shared cache access. The scout core 34 obtains the fetch address though the fetch monitoring bus 66. In one embodiment, the scout core 34 may also obtain information regarding whether the fetch address 70 was a load operation (e.g., read to the shared cache 50 or shared cache 22) or a store operation (e.g., write to the shared cache 50). In another approach, the scout core 34 may also obtain content that indicates the type of fetch (e.g., an instruction related fetch for the I-cache 40 or a data related fetch for the D-cache 42).

Turning now to FIG. 3, an exemplary illustration of the D-cache 42 of the scout core 34 is shown, where each fetch address 70 corresponding to one of the parent cores 32 (FIG. 2) is saved in a unique stack 72. The stacks 72 are generally a list of fetch addresses implemented in memory (e.g., generally the D-cache 42) rather than in hardware registers. Each stack 72 corresponds to one of the parent cores 32. For example, referring now to FIGS. 2-3, the stack A corresponds to Parent Core A, and stack B corresponds to Parent Core B. Stack A stores all of the fetch addresses 70 corresponding to Parent Core A which access the L2 or shared cache 50, and Stack B stores of the fetch address 70 corresponding to Parent Core B which access the L2 or shared cache 50. It should be noted that while the D-cache 42 of the scout core 34 is shown in FIG. 3, in one embodiment the scout core 34 may save the stacks 72 in the shared cache 50 in the event the data is unable to fit entirely on the D-cache 42.

The scout core 34 monitors the stacks 72 to determine if a specific pattern between the stacks 72 exist. Specifically, the scout core 34 monitors the stacks 72 based on a fetch request rate of the shared cache 50 (FIG. 2). For example, if the fetch request rate of the shared cache 50 is every 20 cycles, then the scout core 34 has 20 cycles to perform a monitoring algorithm on the stack 72. The more cycles which are available results in more time existing for the scout core 32 to detect more relatively complex patterns between the stacks 72. For example, the scout core 32 may execute the monitoring algorithm to monitor the stacks 72 based on the rate at which data is stored to the stacks 72. Specifically, if data is written to the stacks 72 at a relatively high rate, then the monitoring algorithm may have a limited amount of time to monitor the stacks 72 for patterns. Likewise, if data is written to the stacks 72 at a relatively low rate, then the monitoring algorithm has more time to monitor the stacks 72. Thus, the monitoring algorithm may be able to detect relatively more complex patterns if the rate of data being written to the stacks 72 is relatively low.

The specific pattern between each of the stacks 72 indicates that a behavior of one or more parent cores 32 (referred to as a mirroring parent core or cores 32) correlates with or may be derived from the behavior of another parent core 32 (referred to as a base parent core 32). Specifically, a cache miss behavior of the mirroring parent core 32 is correlated to the shared cache access behavior of the base parent core 32. Because the cache miss behavior of the mirroring parent core 32 is correlated to the shared cache access behavior of the base parent core 32, one or more prefetches may be made on the behalf of the mirroring parent core 32 based on the shared cache access behavior of the base parent core 32. Thus, if the scout core 34 determines that the specific pattern between the stacks 72 exists, then the scout core 34 may send at least one prefetch for a projected future missing line or lines of cache on the behalf of the mirroring parent core 32 through the fetch request bus 68.

The projected future missing line or lines of cache are intended for the mirroring parent core or cores 32. The projected future missing line or lines of cache are sent by the scout core 34 based on the behavior on the base parent core 32 (e.g., if the base parent core 32 experiences a shared cache access that is determined to be correlated to the cache miss pattern of the mirroring parent core or cores 32). Upon receipt of the prefetch request from the scout core 34, the shared cache 50 sends the data requested by the prefetch to the mirroring parent core 32 through the data return bus 60.

An example of the specific pattern between each of the stacks 72 may now be explained with reference to FIGS. 2-3. In this example, Parent Core A may fetch to address 'X' and then store to address 'X+Y'. The Parent Core B may then make a fetch to the address 'X+Y' after the Parent Core A stores the address 'X+Y'. Thus, the cache miss behavior of Parent Core B is correlated to shared cache access behavior of Parent Core A. In other words, Parent Core B mirrors Parent Core A by fetching to the address 'X+Y' after Parent Core A stores to address 'X+Y'. Thus, Parent Core A is the base parent core 32 and Parent Core B is the mirroring parent core 32. The scout core 34 detects the specific pattern between Stack A and Stack B. Upon detection of the specific pattern, the scout core 34 sends a prefetch for the projected future missing line or lines of cache (e.g., in this example, data stored in address 'X+Y') to the shared cache 50 through the fetch request bus 68 after Parent Core A (e.g., the base parent core 32) saves to the address 'X+Y'. Data correlating to the address 'X+Y' is sent to Parent Core B (e.g., the mirroring core 32) through the data return bus 60.

Figure 4:
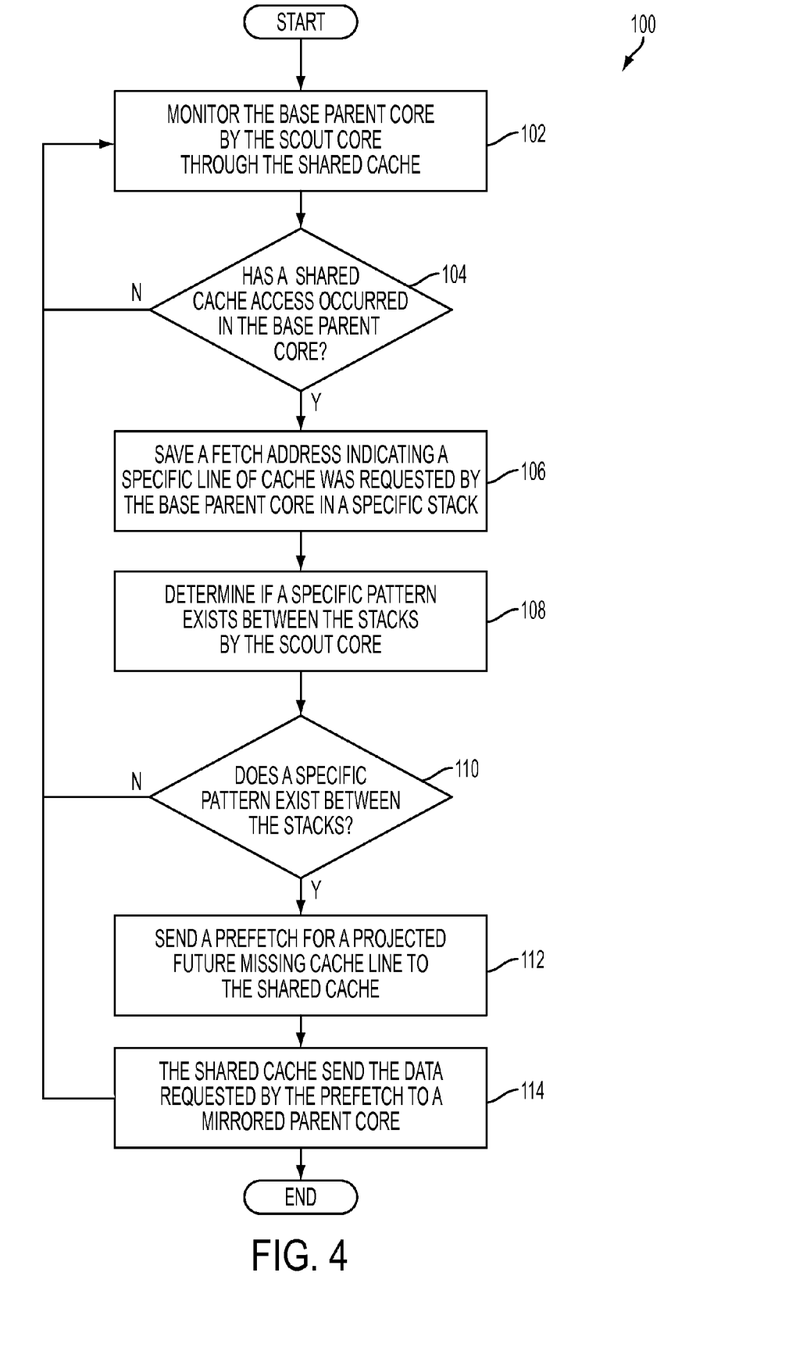
FIG. 4 depicts a process flow for sending prefetches based on shared cache behavior of the parent cores in accordance with an embodiment.

FIG. 4 is a process flow diagram illustrating a method 100 of sending prefetches based on the cache access behavior of the parent cores 32. Referring to FIGS. 1-4, method 100 begins at block 102, where the scout core 34 monitors each of the parent cores 32 through the shared cache 50 to determine if a shared cache access has occurred by the base parent core 32. Method 100 may then proceed to block 104.

In block 104, if the scout core 34 determines that a shared cache access has occurred in the base parent core 32, then method 100 may proceed to block 106. However, if the scout core 34 has not determined if a shared cache access pattern has occurred, then method 100 may proceed back to block 102, where the parent cores 32 are monitored.

In block 106, the scout core 34 saves the fetch address corresponding to the base parent core 32 in the stack 72. The fetch address 70 indicates the location of the specific line of cache that was requested by the base parent core 32 that during the shared cache access. Method 100 may then proceed to block 108.

In block 108, the scout core 34 determines if the specific pattern exists between the stacks 72. The specific pattern indicates that the shared cache access behavior of the parent core 32 (e.g., the base parent core 32) correlates with the cache miss behavior of another parent core 32 (e.g., the mirroring parent core 32). Method 100 may then proceed to block 110.

In block 110, if the scout core 34 determines that a specific pattern exists between the stacks 72, then method 100 may proceed to block 112. However, if the scout core 34 does not detect a specific pattern, then method 100 may proceed back to block 102.

In block 112, the scout core 34 sends at least one prefetch on the behalf of the mirroring parent core 32 for the projected future missing cache line to the shared cache 50 based on the behavior of the base parent core 32 (e.g., if the base parent core 32 experiences a shared cache access that is determined to be correlated to the cache miss pattern of the mirroring parent core or cores 32). Method 100 may then proceed to block 114.

In block 114, the shared cache 50 sends the data requested by the prefetch in block 112 to one or more mirroring parent cores 32 (i.e., the parent core or cores 32 that correlate cache miss behavior to another parent core 32). Method 100 may then terminate, or return back to block 102.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 5:
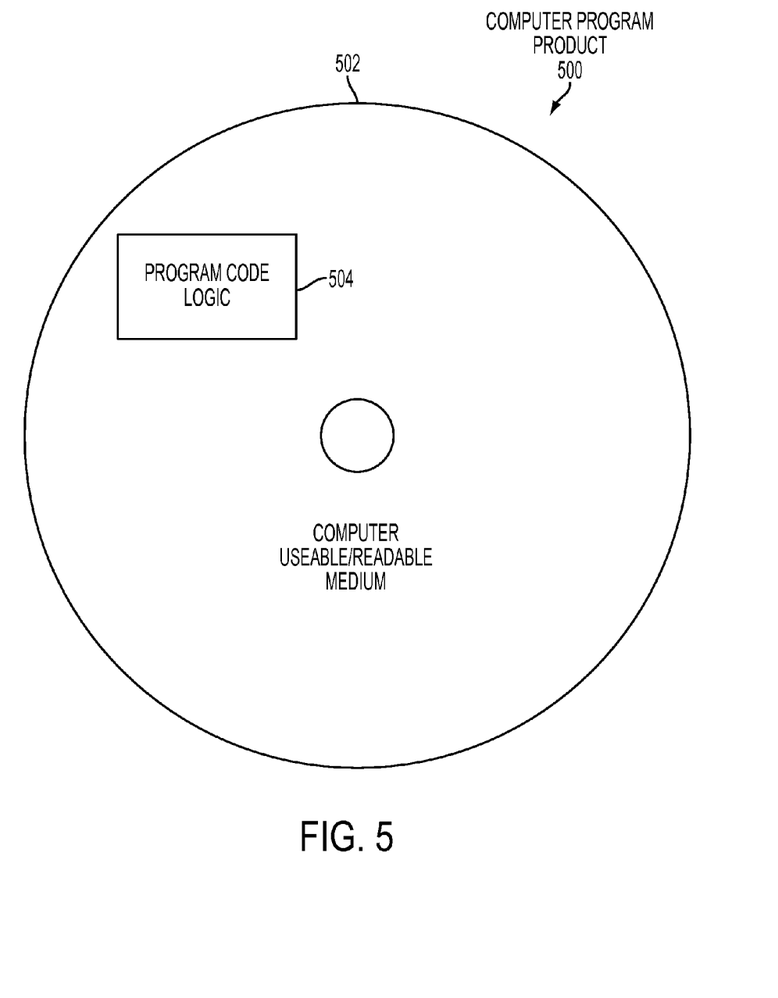
FIG. 5 illustrates a computer program product in accordance with an embodiment.

Referring now to FIG. 5, in one example, a computer program product 500 includes, for instance, one or more storage media 502, wherein the media may be tangible and/or non-transitory, to store computer readable program code means or logic 504 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments relate to a method, system, and computer program product for prefetching data on a chip. The chip has at least one scout core, multiple parent cores that cooperate together to execute various tasks, and a shared cache that is common between the scout core and the multiple parent cores. One of the multiple parent cores is a base parent core and at least one other of the multiple parent cores is a mirroring parent core. An aspect of the embodiments include monitoring the multiple parent cores by the at least one scout core through the shared cache for a shared cache access occurring in the base parent core. The method includes saving a fetch address by the at least one scout core based on the shared cache access occurring. The fetch address indicates a location of a specific line of cache requested by the base parent core. The method includes determining an existence of a specific pattern by the at least one scout core. The specific pattern is based on the fetch address. The specific pattern indicates that the mirroring parent core has a cache miss pattern correlating to a shared cache access pattern of the base parent core. The method includes sending a prefetch request by the at least one scout core on the behalf of the mirroring parent core based on determining the existence of the specific pattern. The prefetch request is for at least one projected future missing line of cache.

In an embodiment, the method further includes sending data requested by the prefetch request to the mirroring parent core through a data return bus. The data return bus is located between the mirroring parent core and the shared cache.

In an embodiment, the method further includes saving data for the fetch address indicating at least one of: the fetch address is one of a load operation and a store operation, and the fetch address includes content indicating one of an instruction related fetch and a data related fetch.

In an embodiment, the method further includes saving the fetch address in one of a plurality of stacks. The plurality of stacks are implemented in a data cache of the at least one scout core such that every one of the multiple parent cores includes a corresponding one of the plurality of stacks.

In an embodiment, the method further includes the at least one scout core executing a monitoring algorithm to monitor the plurality of stacks. The monitoring algorithm is based on a data storage rate of the plurality of stacks.

In an embodiment, the method further includes the at least one scout core monitoring the shared cache through a fetch monitoring bus. The fetch monitoring bus connects the at least one scout core with the shared cache.

Technical effects and benefits include of the computing system 10 as described above include creation of a program that may be executed by the scout core 34. The scout core 34 may monitor multiple parent cores 32 to determine the existence of the specific pattern between the parent cores 32. The projected future missing line of cache is intended for one or more mirroring parent cores 32 (i.e., the parent core or cores 32 that correlate cache miss behavior to another parent core 32). Thus, the scout core 32 may anticipate future data that may be needed by one or more parent cores 32.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for prefetching data on a chip, the system comprising:
   at least one scout core located on the chip;
   multiple parent cores located on the chip, one of the multiple parent cores being a base parent core and at least one other of the multiple parent cores being a mirroring parent core;
   a shared cache that is common between the at least one scout core and the multiple parent cores, the shared cache located on the chip, the system configured to perform a method comprising:
      monitoring the multiple parent cores by the at least one scout core through the shared cache for a shared cache access occurring in the base parent core;
      saving a fetch address in one of a plurality of stacks, the saving by the at least one scout core based on the shared cache access occurring, the fetch address indicating a location of a specific line of cache requested by the base parent core, wherein the plurality of stacks are implemented in a data cache of the at least one scout core by the at least one scout core such that every one of the multiple parent cores includes a corresponding one of the plurality of stacks;
      determining an existence of a specific pattern by the at least one scout core, the specific pattern based on the fetch address, the specific pattern indicating that the mirroring parent core has a cache miss pattern correlating to a shared cache access pattern of the base parent core, the determining including executing a monitoring algorithm to monitor the plurality of stacks based on a data storage rate of the plurality of stacks; and
      sending a prefetch request by the at least one scout core on the behalf of the mirroring parent core based on determining the existence of the specific pattern, the prefetch request for fetching at least one projected future missing line of cache.

2. The computer system of claim 1, wherein data requested by the prefetch request is sent to the mirroring parent core through a data return bus, and wherein the data return bus is located between the mirroring parent core and the shared cache.

3. The computer system of claim 1, wherein data is saved for the fetch address indicating at least one of: the fetch address is one of a load operation and a store operation, and the fetch address includes content indicating one of an instruction related fetch and a data related fetch.

4. The computer system of claim 1, wherein the at least one scout core monitors the shared cache through a fetch monitoring bus, wherein the fetch monitoring bus connects the at least one scout core with the shared cache.

5. The computer system of claim 1, wherein the multiple parent cores are in communication with one another through the shared cache.

* * * * *